US012808704B2

(12) United States Patent
Man et al.

(10) Patent No.: US 12,808,704 B2
(45) Date of Patent: Nov. 24, 2026

(54) METHOD AND APPARATUS OF INTELLIGENT WATER SHORTAGE DETECTION AND MANAGEMENT FOR COOKING APPLIANCE

(71) Applicant: Zhejiang Biyi Electric Appliance Co., Ltd., Yuyao (CN)

(72) Inventors: Kaimong Man, Yuyao (CN); Jiangshui Wu, Yuyao (CN); Weiguo Li, Yuyao (CN)

(73) Assignee: Zhejiang Biyi Electric Appliance Co., Ltd., Yuyao (CN)

( * ) Notice: Subject to any disclaimer, the term of this patent is extended or adjusted under 35 U.S.C. 154(b) by 360 days.

(21) Appl. No.: 18/420,797

(22) Filed: Jan. 24, 2024

(65) Prior Publication Data

US 2025/0035476 A1 Jan. 30, 2025

(30) Foreign Application Priority Data

Jul. 28, 2023 (CN) ......................... 202310942529.4

(51) Int. Cl.
*G01F 23/22* (2006.01)
*F24C 15/00* (2006.01)

(52) U.S. Cl.
CPC ............ *G01F 23/22* (2013.01); *F24C 15/003* (2013.01)

(58) Field of Classification Search
CPC ........ G01F 23/22; F24C 15/003; F24C 7/085; F24C 15/327; A47J 37/0641; A47J 36/32; A47J 37/0664
See application file for complete search history.

(56) References Cited

U.S. PATENT DOCUMENTS 9,841,182 B2 * 12/2017 Shibuya .................... F22B 1/28
2011/0265562 A1 * 11/2011 Li ......................... A47J 27/212 73/304 C
2021/0386233 A1 * 12/2021 Dell'Olio ................ A47J 36/32

* cited by examiner

*Primary Examiner* — Tarun Sinha

(57) ABSTRACT

The method includes: outputting a water shortage prompt by controlling the alarm beeping device in accordance with a preset warning program when it is detected that the steam generator satisfies a preset water shortage control condition, performing a preset water shortage management program, and detecting and obtaining a target temperature corresponding to the steam generator after performing the water shortage management program; determining whether the target temperature is lower than a preset first management temperature; when a determination is positive, confirming that a water shortage management is completed, and when a determination is negative, performing a preset standby control program to control a corresponding heating component of the steam generator to stop heating; and generating water shortage regulatory information to advise the user that the steam generator is currently in a water shortage state and that a mandatory regulatory program to deal with the water shortage state is initiated.

20 Claims, 4 Drawing Sheets

Apparatus of intelligent water shortage detection and management for a cooking appliance

METHOD AND APPARATUS OF INTELLIGENT WATER SHORTAGE DETECTION AND MANAGEMENT FOR COOKING APPLIANCE

CROSS-REFERENCE TO RELATED APPLICATIONS

The present application claims priority of Chinese Patent Application No. 202310942529.4 filed on Jul. 28, 2023 before CNIPA. All the above are hereby incorporated by reference in their entirety.

FIELD

The present disclosure relates to the technical field of water shortage detection and, particularly, to a method and an apparatus of intelligent water shortage detection and management for a cooking appliance.

BACKGROUND

With the popularity of the use of cooking appliances, in order to meet users' demand for use, the product functions corresponding to the cooking appliances are also iteratively updated, in which, besides the basic baking function, based on users' demand for use, the cooking appliances are produced with a steam function, such cooking appliances being configured with a steam generator therein. Conventional steam generators are also configured with a Negative Temperature Coefficient (NTC) thermal protector for temperature control, while cooking appliances with the steam function are also provided with a water tank, and a sensor for detecting the water level in the tank. The water level sensor alarms when the water tank is out of water. However, there are corresponding defects in this type of product: the size and cost of the entire machine is increased due to additional water level sensors; and the possibility for malfunction is increased during actual operation due to the necessity of disposing additional water level sensors. It is seen that it is particularly important to provide a method that simultaneously achieves a water shortage detection function of a cooking appliance without additionally disposing a water level sensor.

SUMMARY

The technical problems to be solved in the present disclosure is to provide a method and an apparatus of intelligent water shortage detection and management for a cooking appliance, which is unnecessary to dispose a water level sensor additionally and may simultaneously achieve the intelligent water shortage detection of the cooking appliance and the intelligent processing function of water shortage.

In order to solve the technical problems mentioned above, disclosed in a first aspect of the present disclosure is a method of intelligent water shortage detection and management for a cooking appliance, in which the cooking appliance is configured with a steam generator and the cooking appliance includes an air fryer, a steam oven or a steam fryer, the method including:

outputting a water shortage prompt by controlling the alarm beeping device in accordance with a preset warning program when it is detected that the steam generator satisfies a preset water shortage control condition, performing a preset water shortage management program, and detecting and obtaining a target temperature corresponding to the steam generator after performing the water shortage management program;

determining whether the target temperature is lower than a preset first management temperature, and confirming that a water shortage management is completed with respect to the steam generator when it is determined that the target temperature is lower than the first management temperature; and performing a preset standby control program to control a corresponding heating component of the steam generator to stop heating when it is determined that the target temperature is higher than or equal to the first management temperature, and generating water shortage regulatory information with respect to the steam generator to advise the user that the steam generator is currently in a water shortage state and that a mandatory regulatory program to deal with the water shortage state is initiated.

As an optional implementation, in the first aspect of the present disclosure, the steam generator satisfying the preset water shortage control condition includes:

identifying that the steam generator satisfies the preset water shortage control condition when a detected temperature corresponding to the steam generator reaches a preset temperature threshold and/or when a steam content in a steam space corresponding to the cooking appliance is lower than a preset steam threshold, in which a water tank in the cooking appliance is used to provide water storage for the steam generator; and the steam content in the steam space is data obtained by collecting the steam content in the steam space after it is confirmed that a steam function corresponding to the steam generator has been initiated.

As an optional implementation, in the first aspect of the present disclosure, performing a preset water shortage management program includes:

generating a water shortage control command with respect to the steam generator, and suspending heating of the steam generator in accordance with the water shortage control command;

controlling a timer to time in accordance with a first preset duration, and performing a preset pumping-cooling program after timing is completed; triggering execution of, after it is confirmed that pumping and cooling are completed for the steam generator, detecting and obtaining a target temperature corresponding to the steam generator after performing the water shortage management program, in which performing a preset pumping-cooling program includes:

controlling a water pump configured in the cooking appliance to perform a continuous pumping and cooling operation for the steam generator within a second preset duration.

As an optional implementation, in the first aspect of the present disclosure, before performing a preset standby control program when it is determined that the target temperature is higher than or equal to the first management temperature, the method also includes:

determining whether an accumulated duration of the timer reaches a third preset duration, and triggering execution of the preset standby control program when it is determined that the accumulated duration of the timer reaches the third preset duration;

performing a preset cooling management program repeatedly when it is determined that the accumulated duration of the timer does not reach the third preset duration, the cooling management program including a timing control program, the pumping-cooling program, and a temperature detection and updating program, in which terminating the cooling management program and triggering execution of the preset standby control program when the accumulated duration of the timer reaches the third preset duration, and the target temperature is higher than a preset second management temperature, the second management temperature being higher than the first management temperature; and terminating the cooling management program and confirming that the water shortage management is completed with respect to the steam generator when the accumulated duration of the timer does not reach the third preset duration and the target temperature is lower than the first management temperature.

As an optional implementation, in the first aspect of the present disclosure, performing the preset cooling management program includes:

Controlling the timer to time in accordance with a preset cooling management duration; after the timing is completed, controlling the water pump configured in the cooking appliance to pump water in accordance with a preset pumping duration; performing a cooling process for the steam generator;

detecting a present temperature of the steam generator and updating the target temperature in accordance with the present temperature after it is confirmed that the cooling process for the steam generator is performed; and updating a performed count of the cooling management program simultaneously, in which the cooling management duration is correspondingly decreased by a fourth preset duration for each increase in the performed count of the cooling management program.

As an optional implementation, in the first aspect of the present disclosure, after generating the water shortage regulatory information with respect to the steam generator, the method also includes:

detecting whether a temporary regulation command triggered by a user is received, the temporary regulation command being used to initiate heating of the steam generator;

determining whether the target temperature is adjusted to be lower than the first management temperature when it is detected that the temporary regulation command triggered by the user is received; and controlling the steam generator and the heating component to perform a heating control operation for the steam generator in accordance with the temporary regulation command when it is determined that the target temperature is adjusted to be lower than the first management temperature.

As an optional implementation, in the first aspect of the present disclosure, when it is determined that the target temperature is not adjusted to be lower than the first management temperature, the method also includes:

generating cooling management information with respect to the steam generator and the heating component in accordance with the target temperature, the first management temperature, and the cooling management program; feeding the cooling management information and the water shortage regulatory information back to the user to advise the user that the target temperature is higher or equal to the first management temperature and the cooling process is required to be performed;

detecting whether a feedback command of the user with respect to the cooling management information is received; and performing the cooling process for the steam generator to adjust the target temperature to be lower than the first management temperature in accordance with the feedback command and the cooling management information when it is detected that the feedback command of the user with respect to the cooling management information is received.

Disclosed in a second aspect of the present disclosure is an apparatus of intelligent water shortage detection and management for a cooking appliance, in which the cooking appliance is configured with a steam generator and the cooking appliance includes an air fryer, a steam oven, or a steam fryer, the method including:

a water shortage management module, used for outputting a water shortage prompt by controlling the alarm beeping device in accordance with a preset warning program when it is detected that the steam generator satisfies a preset water shortage control condition, performing a preset water shortage management program, and detecting and obtaining a target temperature corresponding to the steam generator after performing the water shortage management program;

a determining module, used for determining whether the target temperature is lower than a preset first management temperature;

a confirming module, used for confirming that a water shortage management is completed with respect to the steam generator when it is determined that the target temperature is lower than the first management temperature;

a standby control module, used for performing a preset standby control program to control a corresponding heating component of the steam generator to stop heating when it is determined that the target temperature is higher than or equal to the first management temperature; and a generating module, used for generating water shortage regulatory information with respect to the steam generator to advise the user that the steam generator is currently in a water shortage state and that a mandatory regulatory program to deal with the water shortage state is initiated.

As an optional implementation, in the second aspect of the present disclosure, the steam generator satisfying the preset water shortage control condition specifically includes:

identifying that the steam generator satisfies the preset water shortage control condition when a detected temperature corresponding to the steam generator reaches a preset temperature threshold and/or when a steam content in a steam space corresponding to the cooking appliance is lower than a preset steam threshold, in which a water tank in the cooking appliance is used to provide water storage for the steam generator; and the steam content in the steam space is data obtained by collecting the steam content in the steam space after it is confirmed that a steam function corresponding to the steam generator has been initiated.

As an optional implementation, in the second aspect of the present disclosure, the water shortage management module performing a preset water shortage management program specifically includes:

generating a water shortage control command with respect to the steam generator, and suspending heating of the steam generator in accordance with the water shortage control command; and controlling a timer to time in accordance with a first preset duration, and performing a preset pumping-cooling program after timing is completed; triggering execution of, after it is confirmed that pumping and cooling is completed for the steam generator, detecting and obtaining a target temperature corresponding to the steam generator after performing the water shortage management program, in which performing a preset pumping-cooling program specifically includes:

controlling a water pump configured in the cooking appliance to perform a continuous pumping and cooling operation for the steam generator within a second preset duration.

As an optional implementation, in the second aspect of the present disclosure, the determining module is also used for, before performing a preset standby control program when it is determined that the target temperature is higher than or equal to the first management temperature, determining whether an accumulated duration of the timer reaches a third preset duration, and triggering the standby control module to execute the preset standby control program when it is determined that the accumulated duration of the timer reaches the third preset duration;

the apparatus also includes:

a cooling management module, used for performing a preset cooling management program repeatedly when it is determined that the accumulated duration of the timer does not reach the third preset duration, the cooling management program including a timing control program, the pumping-cooling program, and a temperature detection and updating program;

an interrupt control module, used for terminating the cooling management program and triggering the standby control module to execute the preset standby control program when the accumulated duration of the timer reaches the third preset duration and the target temperature is higher than a preset second management temperature, the second management temperature being higher than the first management temperature; and the interrupt control module is also used for terminating the cooling management program and confirming that the water shortage management is completed with respect to the steam generator when the accumulated duration of the timer does not reach the third preset duration and the target temperature is lower than the first management temperature.

As an optional implementation, in the second aspect of the present disclosure, the cooling management module performing the preset cooling management program specifically includes:

controlling the timer to time in accordance with a preset cooling management duration; after the timing is completed, controlling the water pump configured in the cooking appliance to pump water in accordance with a preset pumping duration; cooling down the steam generator;

detecting a present temperature of the steam generator and updating the target temperature in accordance with the present temperature after it is confirmed that the cooling process for the steam generator is performed; and updating a performed count of the cooling management program simultaneously, in which the cooling management duration is correspondingly decreased by a fourth preset duration for each increase in the performed count of the cooling management program.

As an optional implementation, in the second aspect of the present disclosure, the apparatus also includes:

a detecting module, used for, after generating the water shortage regulatory information with respect to the steam generator, detecting whether a temporary regulation command triggered by a user is received, the temporary regulation command being used to initiate heating of the steam generator;

the determining module is also used for determining whether the target temperature is adjusted to be lower than the first management temperature when it is detected that the temporary regulation command triggered by the user is received; and a heating control module, used for controlling the steam generator and the heating component to perform a heating control operation for the steam generator in accordance with the temporary regulation command when it is determined that the target temperature is adjusted to be lower than the first management temperature.

As an optional implementation, in the second aspect of the present disclosure, the generating module is also used for generating cooling management information with respect to the steam generator and the heating component in accordance with the target temperature, the first management temperature, and the cooling management program when it is determined that the target temperature is not adjusted to be lower than the first management temperature;

the apparatus also includes:

a feedback module, used for feeding the cooling management information and the water shortage regulatory information back to the user to advise the user that the target temperature is higher or equal to the first management temperature and the cooling process is required to be performed;

the detecting module is also used for detecting whether a feedback command of the user with respect to the cooling management information is received; and the cooling management module is also used for performing the cooling process for the steam generator to adjust the target temperature to be lower than the first management temperature in accordance with the feedback command and the cooling management information when it is detected that the feedback command of the user with respect to the cooling management information is received.

Disclosed in a third aspect of the present disclosure is an apparatus of intelligent water shortage detection and management for a cooking appliance, the apparatus including:

a memory, memorized with an executable code; and a processor, coupled with the memory, in which the processor invokes the executable code memorized in the memory to perform the method of intelligent water shortage detection and management for a cooking appliance disclosed in the first aspect of the present disclosure.

Disclosed as a fourth aspect in the present disclosure is a non-transitory computer memory medium, and the non-transitory computer memory medium memorizes computer instructions; when the computer instructions are invoked, the method of intelligent water shortage detection and management for a cooking appliance disclosed in the first aspect of the present disclosure is performed.

Compared to the prior art, the embodiments of the present disclosure have beneficial effects as follows.

Provided in the embodiment of the present disclosure is a method of intelligent water shortage detection and management for a cooking appliance, the method including: outputting a water shortage prompt by controlling the alarm beeping device in accordance with a preset warning program when it is detected that the steam generator satisfies a preset water shortage control condition, performing a preset water shortage management program, and detecting and obtaining a target temperature corresponding to the steam generator after performing the water shortage management program; determining whether the target temperature is lower than a preset first management temperature; when it is determined that the target temperature is lower than the first management temperature, confirming that a water shortage management is completed with respect to the steam generator, and when it is determined that the target temperature is higher or equal to the first management temperature, performing a preset standby control program to control a corresponding heating component of the steam generator to stop heating; and generating water shortage regulatory information with respect to the steam generator to advise the user that the steam generator is currently in a water shortage state and that a mandatory regulatory program to deal with the water shortage state is initiated. Evidently, the implementation of the present disclosure provides a self-test program for the steam generator to determine whether the water shortage control conditions are met, and outputs a corresponding water shortage prompt when the water shortage control conditions are met in the steam generator, so as to facilitate the user to be aware of a current state of the steam generator in real time. Intelligent execution of the corresponding water shortage management program is also achieved. The target temperature after performing the water shortage management program is detected, and when the target temperature is higher than or equal to the first management temperature, switching to perform the standby control program achieves intelligent processing in the water shortage state of the cooking appliance/steam generator, reducing the probability of the machine being damaged due to the cooking appliance/steam generator being in the water shortage state. Additionally, different from the conventional water shortage detection function that requires the configuration of additional water level sensors, the embodiments of the present disclosure may detect the temperature of the steam generator only by means of the NTC configured basically, reducing the probability of the entire machine malfunctioning due to the additional configuration of the water level sensors.

BRIEF DESCRIPTION OF THE DRAWINGS

In order to illustrate the technical solutions of the embodiments of the present disclosure more clearly, the following drawings are briefly described as required in the context of the embodiments. Obviously, the following drawings illustrate only some of the embodiments of the present disclosure. Other relevant drawings may be obtained on the basis of these drawings without any creative effort by those skilled in the art.

DETAILED DESCRIPTION OF THE EMBODIMENTS

Figure 1:
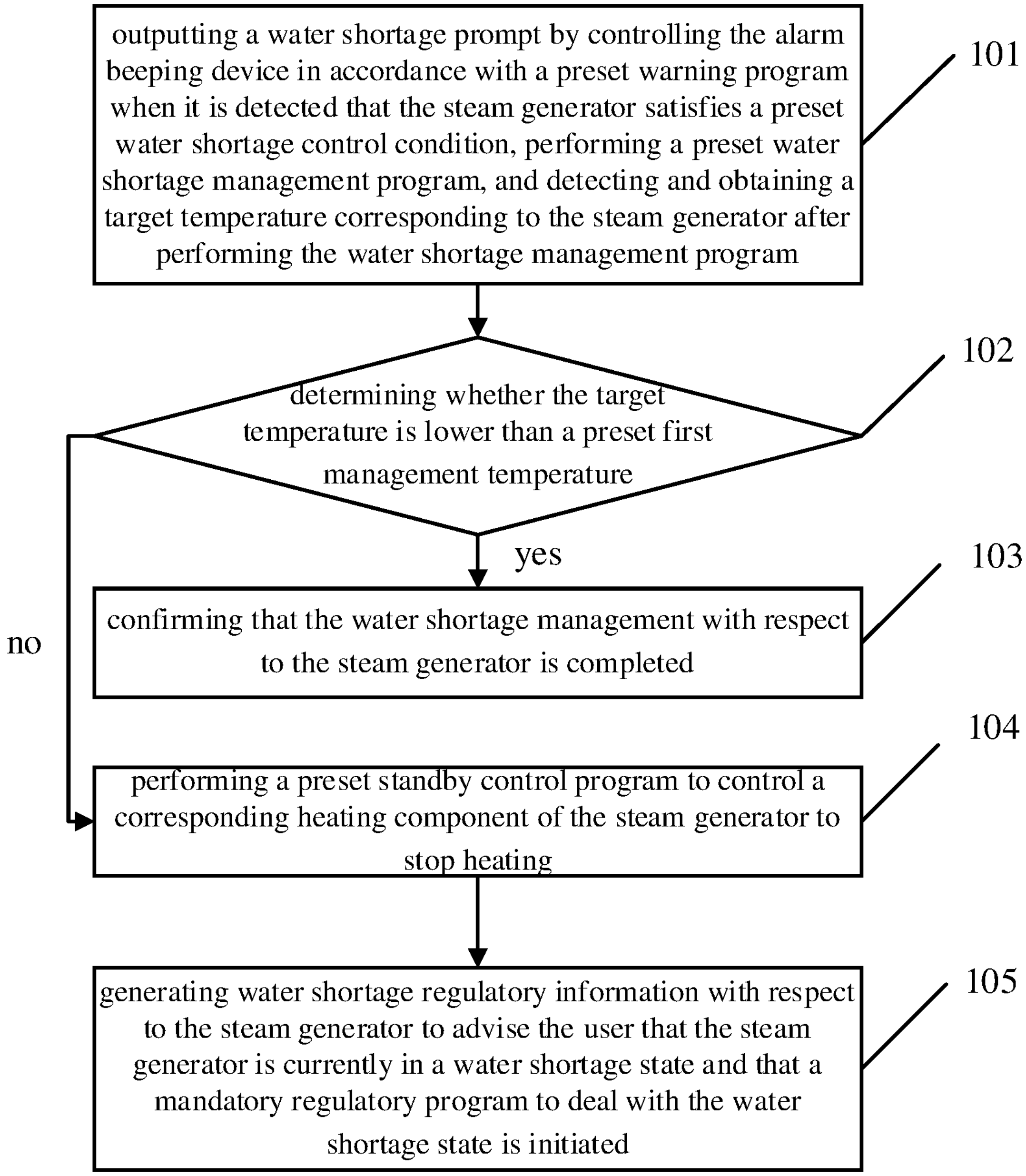
FIG. 1 is a flow diagram of a method of intelligent water shortage detection and management for a cooking appliance disclosed in an embodiment of the present disclosure.

For a better understanding of the solutions of the present disclosure by those skilled in the art, the technical solutions in the embodiments of the present disclosure are clearly and completely described and discussed below in conjunction with the attached drawings in the embodiments of the present disclosure. Obviously, the embodiments described herein are only some of the embodiments of the present disclosure but not all of them. Based on the embodiments in the present disclosure, all other embodiments obtained by those skilled in the art without creative efforts fall within the scope of protection of the present disclosure.

The terms “first”, “second”, and the like in the specification, the claims and the above-mentioned drawings of the present disclosure are used to identify different objects and are not intended to describe a particular sequence. In addition, the terms “comprise” and “include”, and any derivatives and conjugations thereof, are intended to cover non-exclusive inclusion. For example, a process, method, apparatus, product, or device that includes a series of steps or units is not limited to the listed steps or units, but optionally also includes steps or units that are not listed, or optionally also includes other steps or units that are inherent to those processes, methods, products, or devices.

The term “embodiment” herein means that a particular feature, structure or characteristic described in conjunction with an embodiment may be included in at least one embodiment of the present disclosure. The presence of the term in various places in the specification does not necessarily indicate the same embodiment, nor is it a separate or alternative embodiment that is mutually exclusive with other embodiments. It is understood, both explicitly and implicitly, by those skilled in the art that the embodiments described herein may be combined with other embodiments.

Disclosed in the present disclosure is a method and an apparatus of intelligent water shortage detection and management for a cooking appliance, providing a self-test program for the steam generator to determine whether the water shortage control conditions are met, outputting a corresponding water shortage prompt when the water shortage control conditions are met in the steam generator, so as to facilitate the user to be aware of a current state of the steam generator in real time. Intelligent execution of the corresponding water shortage management program is also achieved. The target temperature after performing the water shortage management program is detected, and when the target temperature is higher than or equal to the first management temperature, switching to perform the standby control program achieves intelligent processing in the water shortage state of the cooking appliance/steam generator, reducing the probability of the machine being damaged due to the cooking appliance/steam generator being in the water shortage state. Additionally, different from the conventional water shortage detection function that requires the configuration of additional water level sensors, the embodiments of the present disclosure may detect the temperature of the steam generator only by means of the NTC configured basically, reducing the probability of the entire machine malfunctioning due to the additional configuration of the water level sensors. Detailed descriptions are provided respectively as follows.

Embodiment 1

Referring to FIG. 1, FIG. 1 is a flow diagram of a method of intelligent water shortage detection and management for a cooking appliance disclosed in an embodiment of the present disclosure, in which the method of intelligent water shortage detection and management for a cooking appliance described in FIG. 1 may be applied to an apparatus of intelligent water shortage detection and management for a cooking appliance. Specifically, the apparatus may be a cooking appliance, and the cooking appliance is configured with a steam generator, which is not limited in embodiments of the present disclosure. As shown in FIG. 1, the method of intelligent water shortage detection and management for a cooking appliance may include following operations.

In step 101, outputting a water shortage prompt by controlling the alarm beeping device in accordance with a preset warning program when it is detected that the steam generator satisfies a preset water shortage control condition, performing a preset water shortage management program, and detecting and obtaining a target temperature corresponding to the steam generator after performing the water shortage management program.

In the embodiment of the present disclosure, the cooking appliance may specifically an air fryer, a steam oven, or a steam fryer, among which are all configured with a steam generator.

In the embodiment of the present disclosure, the steam generator satisfying the preset water shortage control condition specifically includes:

identifying that the steam generator satisfies the preset water shortage control condition when a detected temperature corresponding to the steam generator reaches a preset temperature threshold and/or when a steam content in a steam space corresponding to the cooking appliance is lower than a preset steam threshold, in which a water tank in the cooking appliance is used to provide water storage for the steam generator; and the steam content in the steam space is data obtained by collecting the steam content in the steam space after it is confirmed that a steam function corresponding to the steam generator has been initiated. In such a case, the corresponding data to be monitored are the corresponding temperature of the steam generator and/or the steam content in the steam space without the configuration of a water level sensor to detect the water storage of the water tank.

In the embodiment of the present disclosure, the alarm beeping device may be a buzzer. The alarm beeping device outputs a water shortage prompt may specifically be to control the buzzer to buzz 10 times in accordance with the preset warning program. Detecting the target temperature of the steam generator may be a temperature detection by an NTC configured on the steam generator or configured on the cooking appliance, which is not limited in embodiments of the present disclosure.

In step 102, determining whether the target temperature is lower than a preset first management temperature.

In the embodiment of the present disclosure, performing step 103 when a determination result of step 102 is positive; and performing step 104 when a determination result of step 102 is negative.

In the embodiment of the present disclosure, specifically, the target temperature is a real-time temperature after temperature detection of the steam generator. The first management temperature is a preset temperature threshold, and the temperature threshold may be 155° C.-160° C., which is not limited in embodiments of the present disclosure.

In step 103, confirming that the water shortage management with respect to the steam generator is completed.

In the embodiment of the present disclosure, cancelling the water shortage management for the steam generator after it is confirmed that the water shortage management with respect to the steam generator is completed in step 103.

In step 104, performing a preset standby control program to control a corresponding heating component of the steam generator to stop heating.

In the embodiment of the present disclosure, the heating component includes a steam pipe, a water pump, a thermal fuse, a thermal protector, an NTC, an inlet pipe, and other components that may assist in the heating of the steam generator or that correspond to linkage when the steam generator is in operation, which is not limited in embodiments of the present disclosure.

In step 105, generating water shortage regulatory information with respect to the steam generator to advise the user that the steam generator is currently in a water shortage state and that a mandatory regulatory program to deal with the water shortage state is initiated.

Evidently, the implementation of the method of intelligent water shortage detection and management for a cooking appliance described in FIG. 1 provides a self-test program for the steam generator to determine whether the water shortage control conditions are met, and outputs a corresponding water shortage prompt when the water shortage control conditions are met in the steam generator, so as to facilitate the user to be aware of a current state of the steam generator in real time. Intelligent execution of the corresponding water shortage management program is also achieved. The target temperature after performing the water shortage management program is detected, and when the target temperature is higher than or equal to the first management temperature, switching to perform the standby control program achieves intelligent processing in the water shortage state of the cooking appliance/steam generator, reducing the probability of the machine being damaged due to the cooking appliance/steam generator being in the water shortage state. Additionally, different from the conventional water shortage detection function that requires the configuration of additional water level sensors, the embodiments of the present disclosure may detect the temperature of the steam generator only by means of the NTC configured basically, reducing the probability of the entire machine malfunctioning due to the additional configuration of the water level sensors.

In an optional implementation, performing a preset water shortage management program in step 101 specifically includes:

generating a water shortage control command with respect to the steam generator, and suspending heating of the steam generator in accordance with the water shortage control command;

controlling a timer to time in accordance with a first preset duration, and performing a preset pumping-cooling program after timing is completed; triggering execution of, after it is confirmed that pumping and cooling is completed for the steam generator, detecting and obtaining a target temperature corresponding to the steam generator after performing the water shortage management program, in which performing a preset pumping-cooling program includes:

controlling a water pump configured in the cooking appliance to perform a continuous pumping and cooling operation for the steam generator within a second preset duration.

In this optional implementation, specifically, when it is confirmed that the steam generator is in a water shortage state, suspending heating of the steam generator and waiting for a first preset duration (e.g., 30 s) by means of a timer. Then, controlling the water pump to pump water continuously for a second preset duration (e.g., continuous pumping for 10 s) and cooling down the steam generator.

When the steam generator is in the water shortage state, the remaining water storage capacity of the default water tank is too low, e.g., less than 5% of the maximum water storage capacity. In such a case, controlling the water pump extracts the external water source through the inlet pipe and delivers it to the water tank, and then the stored water in the tank is extracted for cooling down the steam generator.

Evidently, in this optional implementation, intelligent timing, pumping, and temperature lowering are performed when the steam generator is in a water shortage state, achieving the accuracy and reliability of temperature lowering for the steam generator.

In an optional implementation, before performing a preset standby control program in step 104 when it is determined that the target temperature is higher than or equal to the first management temperature, the method also includes:

determining whether an accumulated duration of the timer reaches a third preset duration, and triggering execution of the preset standby control program when it is determined that the accumulated duration of the timer reaches the third preset duration;

performing a preset cooling management program repeatedly when it is determined that the accumulated duration of the timer does not reach the third preset duration, the cooling management program including a timing control program, the pumping-cooling program, and a temperature detection and updating program, in which terminating the cooling management program and triggering execution of the preset standby control program when the accumulated duration of the timer reaches the third preset duration and the target temperature is higher than a preset second management temperature, the second management temperature being higher than the first management temperature; and terminating the cooling management program and confirming that the water shortage management is completed with respect to the steam generator when the accumulated duration of the timer does not reach the third preset duration and the target temperature is lower than the first management temperature.

In this optional implementation, performing the preset cooling management program mentioned above specifically includes:

controlling the timer to time in accordance with a preset cooling management duration;

after the timing is completed, controlling the water pump configured in the cooking appliance to pump water in accordance with a preset pumping duration; performing a cooling process for the steam generator;

detecting a present temperature of the steam generator and updating the target temperature in accordance with the present temperature after it is confirmed that the cooling process for the steam generator is performed; and updating a performed count of the cooling management program simultaneously, in which the cooling management duration is correspondingly decreased by a fourth preset duration for each increase in the performed count of the cooling management program.

In this optional implementation, specifically, it is assumed that the third preset duration may be 100 s, that the cooling management duration may initially be set to 30 s, that the pumping duration may be 10 s, and that the fourth preset duration may be 5 s.

Specifically, a timing is started after it is confirmed that the steam generator is in a water shortage state, performing a timing wait of 30 s, pumping water for 10 s, and detecting the temperature of the steam generator sequentially within 100 s. If the temperature is not lower than a first preset temperature (e.g., 155° C.), updating the performed count of the cooling management program (the accumulated performed count is increased by 1), and repeating the prior timing wait, pumping water, temperature detection operation, in which each timing wait time may be decreasing, such as the first timing wait for 30 s, the second timing wait for 25 s, and the third timing wait for 20 s. Until the temperature of the steam generator is detected to be reduced to less than 155° C. within the 100 s, it is determined that the temperature reduction is a success. If it fails to successfully reduce the temperature of the steam generator to less than 155° C. within the 100 s, the standby control program is performed. Optionally, before the standby control program is performed, an ultimate temperature of the steam generator may be further determined, and if the temperature is higher than or equal to the second preset temperature (such as 160° C.), then the standby control program is performed.

Evidently, in this optional implementation, a cooling management program is correspondingly set up to enable repeated performances of the cooling management program for the steam generator within a third preset duration, achieving one-by-one cooling processing, achieving the intelligent design of the cooling management process, and improving both the accuracy in the cooling processing and the cooling efficiency of the steam generator.

Embodiment 2

Figure 2:
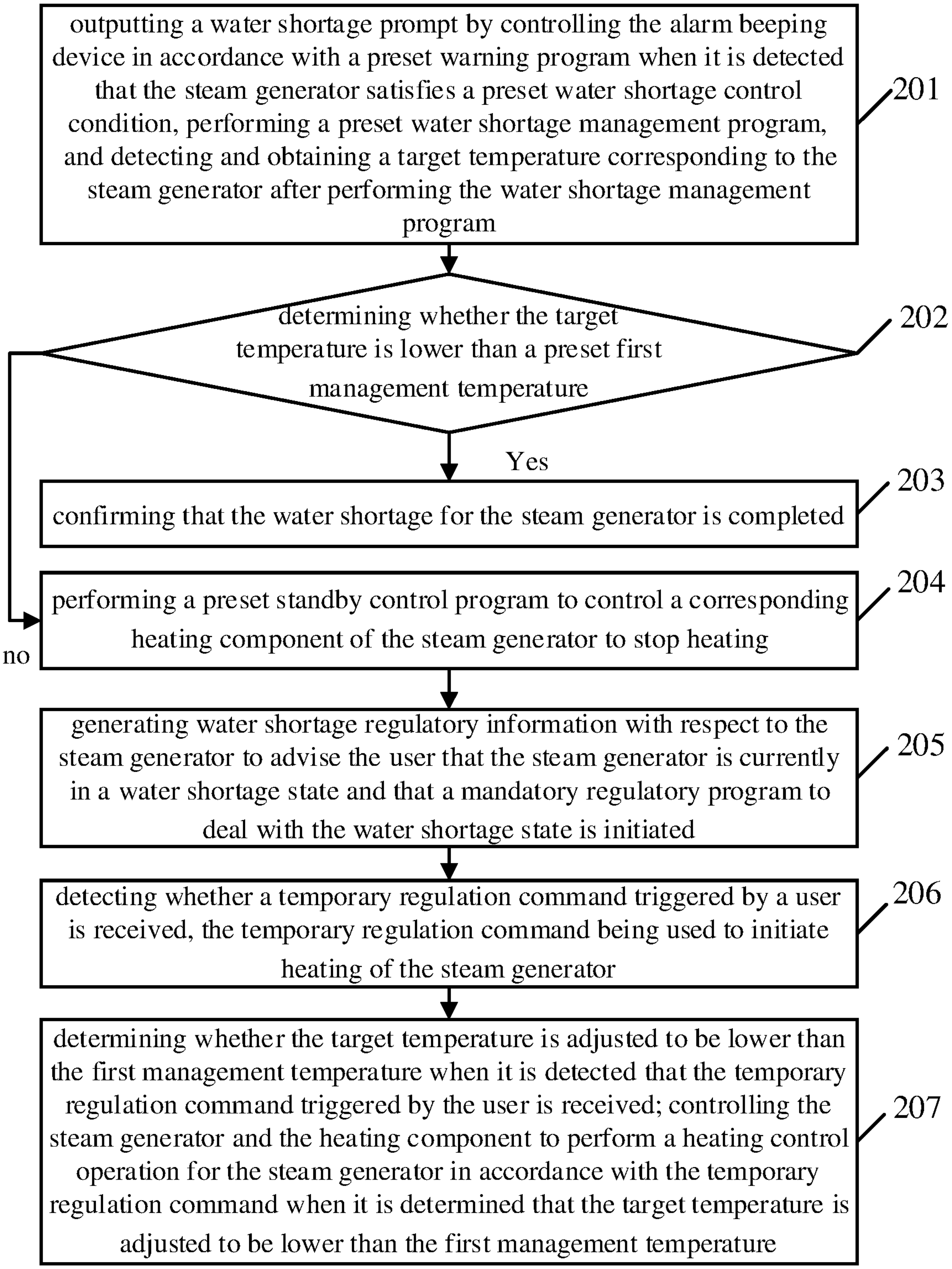
FIG. 2 is a flow diagram of another method of intelligent water shortage detection and management for a cooking appliance disclosed in an embodiment of the present disclosure.

Referring to FIG. 2, FIG. 2 is a flow diagram of another method of intelligent water shortage detection and management for a cooking appliance disclosed in an embodiment of the present disclosure, in which the method of intelligent water shortage detection and management for a cooking appliance described in FIG. 2 may also be applied to an apparatus of intelligent water shortage detection and management for a cooking appliance, which is not limited in embodiments of the present disclosure. As shown in FIG. 2, the method of intelligent water shortage detection and management for a cooking appliance may include following operations.

In step 201, outputting a water shortage prompt by controlling the alarm beeping device in accordance with a preset warning program when it is detected that the steam generator satisfies a preset water shortage control condition, performing a preset water shortage management program, and detecting and obtaining a target temperature corresponding to the steam generator after performing the water shortage management program.

In step 202, determining whether the target temperature is lower than a preset first management temperature.

In the embodiment of the present disclosure, performing step 203 when a determination result of step 202 is positive; and performing step 204 when a determination result of step 202 is negative.

In step 203, confirming that the water shortage for the steam generator is completed.

In step 204, performing a preset standby control program to control a corresponding heating component of the steam generator to stop heating.

In step 205, generating water shortage regulatory information with respect to the steam generator to advise the user that the steam generator is currently in a water shortage state and that a mandatory regulatory program to deal with the water shortage state is initiated.

In the embodiment of the present disclosure, triggering to perform step 206 after generating the water shortage regulatory information with respect to the steam generator in step 205.

In the present embodiment of the disclosure, regarding other descriptions of step 201 to step 205, please refer to another detailed description in embodiment 1 regarding step 101 to step 105, which is not repeated in the present embodiment of the disclosure.

In step 206, detecting whether a temporary regulation command triggered by a user is received, the temporary regulation command being used to initiate heating of the steam generator.

In the embodiment of the present disclosure, specifically, the temporary regulation command is a command that is temporarily triggered when the steam generator is in a water shortage mandatory management state and the user ignores the prompted water shortage regulatory information.

In step 207, determining whether the target temperature is adjusted to be lower than the first management temperature when it is detected that the temporary regulation command triggered by the user is received; controlling the steam generator and the heating component to perform a heating control operation for the steam generator in accordance with the temporary regulation command when it is determined that the target temperature is adjusted to be lower than the first management temperature.

Evidently, by implementing the method of intelligent water shortage detection and management for a cooking appliance described in FIG. 2, for the temporary regulation command triggered by the user when the steam generator is in the water shortage mandatory management state, the corresponding temperature detection program is set up, which is able to detect the target temperature of the steam generator in real time based on the temporary regulation command, and the steam generator as well as the heating components may restart after it is determined that the target temperature is adjusted to the first management temperature, reducing the occurrence of failing to respond to the temporary regulation command of the user due to not timely updating of the value corresponding to the target temperature.

In an optional implementation, when it is determined in step 207 that the target temperature is not adjusted to be lower than the first management temperature, the method also includes:

generating cooling management information with respect to the steam generator and the heating component in accordance with the target temperature, the first management temperature, and the cooling management program; feeding the cooling management information and the water shortage regulatory information back to the user to advise the user that the target temperature is higher or equal to the first management temperature and the cooling process is required to be performed;

detecting whether a feedback command of the user with respect to the cooling management information is received; and performing the cooling process for the steam generator to adjust the target temperature to be lower than the first management temperature in accordance with the feedback command and the cooling management information when it is detected that the feedback command of the user with respect to the cooling management information is received.

Evidently, in this optional implementation, in the case of detecting the temporary regulation command triggered by the user and aiming to adjust the target temperature to the first management temperature, the corresponding cooling management information is generated by integrating a number of parameters based on the target temperature, the first management temperature, and the cooling management program, and then the cooling management information as well as the water shortage regulatory information is fed back to the user in order to secondly prompt the user that the steam generator/cooking appliance is in the water shortage mandatory management state, which simultaneously facilitates the user to accurately and quickly deal with the current water shortage mandatory management state of the steam generator/cooking appliance (timely pumping/steam generator cooling) in accordance with the cooling management information, while improving the user experience, improving the service life of the entire cooking appliance, reducing the probability of malfunctioning of the entire cooking appliance.

Embodiment 3

Figure 3:
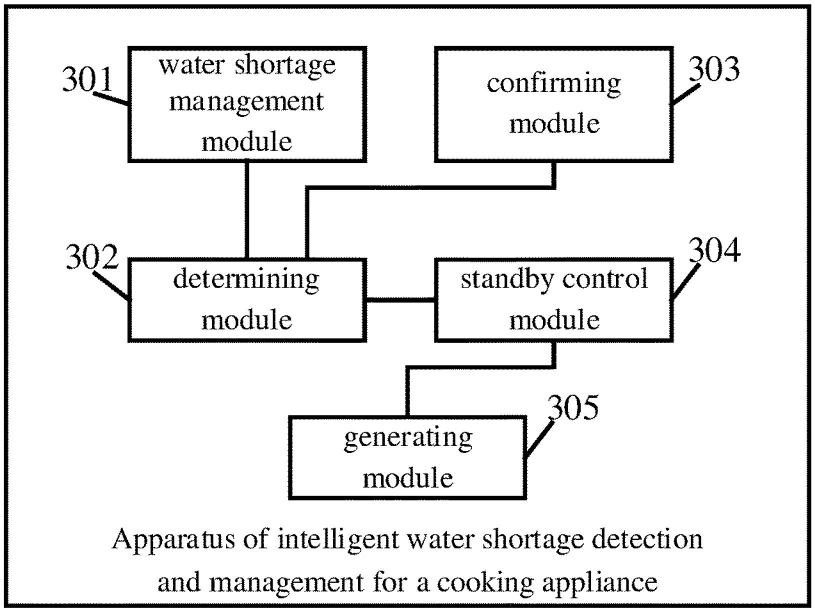
FIG. 3 is a structural diagram of an apparatus of intelligent water shortage detection and management for a cooking appliance disclosed in an embodiment of the present disclosure.

Referring to FIG. 3, FIG. 3 is a structural diagram of an apparatus of intelligent water shortage detection and management for a cooking appliance disclosed in an embodiment of the present disclosure, in which the apparatus of intelligent water shortage detection and management for a cooking appliance may be a terminal, a device, a system or a server of intelligent water shortage detection and management for a cooking appliance. The server may be a local server, or a remote server, or a cloud server (also known as a cloud terminal server). When the server is a non-cloud-server, the non-cloud-server is capable of communicatively connecting with the cloud server, which is not limited in embodiments of the present disclosure. As shown in FIG. 3, the apparatus of intelligent water shortage detection and management for a cooking appliance may include a water shortage management module 301, a determining module 302, a confirming module 303, a standby control module 304 and a generating module 305, in which the water shortage management module 301 is used for outputting a water shortage prompt by controlling the alarm beeping device in accordance with a preset warning program when it is detected that the steam generator satisfies a preset water shortage control condition, performing a preset water shortage management program, and detecting and obtaining a target temperature corresponding to the steam generator after performing the water shortage management program.

In the embodiment of the present disclosure, the steam generator satisfying the preset water shortage control condition specifically includes:

identifying that the steam generator satisfies the preset water shortage control condition when a detected temperature corresponding to the steam generator reaches a preset temperature threshold and/or when a steam content in a steam space corresponding to the cooking appliance is lower than a preset steam threshold, in which a water tank in the cooking appliance is used to provide water storage for the steam generator; and the steam content in the steam space is data obtained by collecting the steam content in the steam space after it is confirmed that a steam function corresponding to the steam generator has been initiated.

The determining module 302 is used for determining whether the target temperature is lower than a preset first management temperature.

The confirming module 303 is used for confirming that a water shortage management is completed with respect to the steam generator when it is determined by the determining module 302 that the target temperature is lower than the first management temperature.

The standby control module 304 is used for performing a preset standby control program to control a corresponding heating component of the steam generator to stop heating when it is determined by the determining module 302 that the target temperature is higher than or equal to the first management temperature.

The generating module 305 is used for generating water shortage regulatory information with respect to the steam generator to advise the user that the steam generator is currently in a water shortage state and that a mandatory regulatory program to deal with the water shortage state is initiated.

Evidently, the implementation of the apparatus of intelligent water shortage detection and management for a cooking appliance described in FIG. 3 provides a self-test program for the steam generator to determine whether the water shortage control conditions are met, and outputs a corresponding water shortage prompt when the water shortage control conditions are met in the steam generator, so as to facilitate the user to be aware of a current state of the steam generator in real time. Intelligent execution of the corresponding water shortage management program is also achieved. The target temperature after performing the water shortage management program is detected, and when the target temperature is higher than or equal to the first management temperature, switching to perform the standby control program achieves intelligent processing in the water shortage state of the cooking appliance/steam generator, reducing the probability of the machine being damaged due to the cooking appliance/steam generator being in the water shortage state. Additionally, different from the conventional water shortage detection function that requires the configuration of additional water level sensors, the embodiments of the present disclosure may detect the temperature of the steam generator only by means of the NTC configured basically, reducing the probability of the entire machine malfunctioning due to the additional configuration of the water level sensors.

In an optional implementation, the water shortage management module 301 performing the preset water shortage control program specifically includes:

generating a water shortage control command with respect to the steam generator, and suspending heating of the steam generator in accordance with the water shortage control command;

controlling a timer to time in accordance with a first preset duration, and performing a preset pumping-cooling program after timing is completed; triggering execution of, after it is confirmed that pumping and cooling is completed for the steam generator, detecting and obtaining a target temperature corresponding to the steam generator after performing the water shortage management program, in which performing a preset pumping-cooling program specifically includes:

controlling a water pump configured in the cooking appliance to perform a continuous pumping and cooling operation for the steam generator within a second preset duration.

Evidently, in this optional implementation, intelligent timing, pumping, and temperature lowering are performed when the steam generator is in a water shortage state, achieving the accuracy and reliability of temperature lowering for the steam generator.

Figure 4:
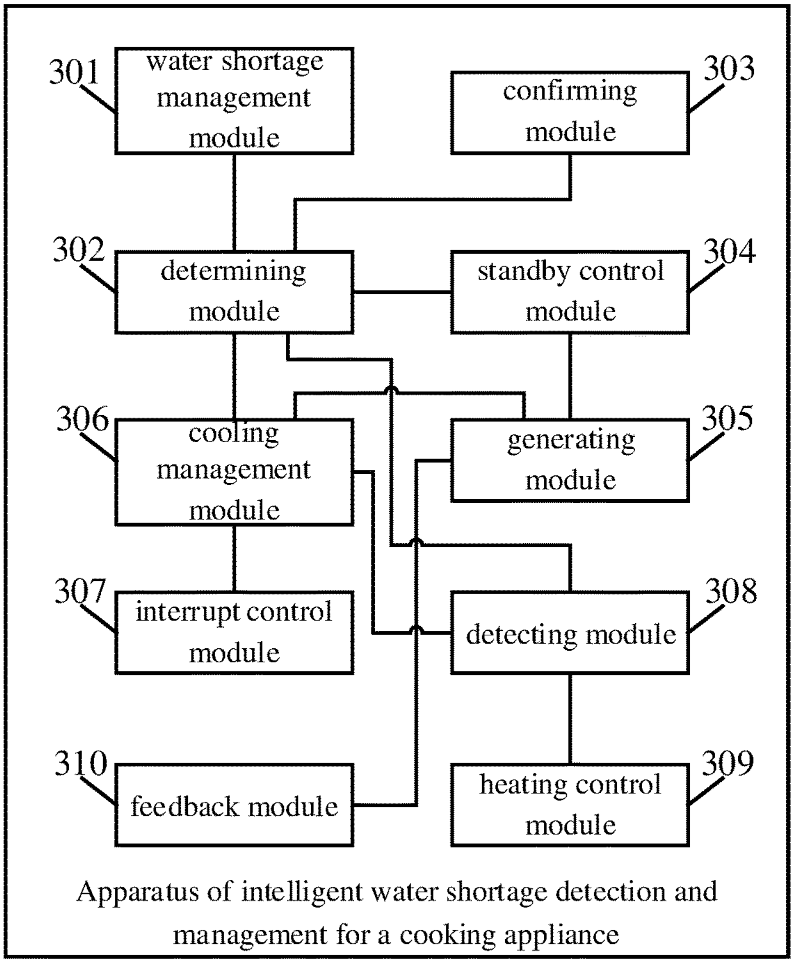
FIG. 4 is a structural diagram of another apparatus of intelligent water shortage detection and management for a cooking appliance disclosed in an embodiment of the present disclosure.

In an optional implementation, the determining module is also used for, before the standby control module 304 performing a preset standby control program when it is determined that the target temperature is higher than or equal to the first management temperature, determining whether an accumulated duration of the timer reaches a third preset duration, and triggering the standby control module 304 to execute the preset standby control program when it is determined that the accumulated duration of the timer reaches the third preset duration;

As shown in FIG. 4, the apparatus also includes a cooling management module 306 and an interrupt control module 307.

The cooling management module 306 is used for performing a preset cooling management program repeatedly when it is determined that the accumulated duration of the timer does not reach the third preset duration, the cooling management program including a timing control program, the pumping-cooling program, and a temperature detection and updating program.

The interrupt control module 307 is used for terminating the cooling management program and triggering the standby control module 304 to execute the preset standby control program when the accumulated duration of the timer reaches the third preset duration and the target temperature is higher than a preset second management temperature, the second management temperature being higher than the first management temperature.

The interrupt control module 307 is also used for terminating the cooling management program and confirming that the water shortage management is completed with respect to the steam generator when the accumulated duration of the timer does not reach the third preset duration and the target temperature is lower than the first management temperature.

In this optional implementation, the cooling management module 306 performing the preset cooling management program specifically includes:

controlling the timer to time in accordance with a preset cooling management duration; after the timing is completed, controlling the water pump configured in the cooking appliance to pump water in accordance with a preset pumping duration; performing a cooling process for the steam generator;

detecting a present temperature of the steam generator and updating the target temperature in accordance with the present temperature after it is confirmed that the cooling process for the steam generator is performed; and updating a performed count of the cooling management program simultaneously, in which the cooling management duration is correspondingly decreased by a fourth preset duration for each increase in the performed count of the cooling management program.

Evidently, by implementing the apparatus of intelligent water shortage detection and management for a cooking appliance described in FIG. 4, a cooling management program is correspondingly set up to enable repeated performances of the cooling management program for the steam generator within a third preset duration, achieving one-by-one cooling processing, achieving the intelligent design of the cooling management process, and improving both the accuracy in the cooling processing and the cooling efficiency of the steam generator.

In an optional implementation, as shown in FIG. 4, the apparatus also includes a detecting module 308 and a heating control module 309.

The detecting module 308 is used for, after generating the water shortage regulatory information with respect to the steam generator, detecting whether a temporary regulation command triggered by a user is received, the temporary regulation command being used to initiate heating of the steam generator.

The determining module 302 is also used for determining whether the target temperature is adjusted to be lower than the first management temperature when it is detected that the temporary regulation command triggered by the user is received.

The heating control module 309 is used for controlling the steam generator and the heating component to perform a heating control operation for the steam generator in accordance with the temporary regulation command when it is determined that the target temperature is adjusted to be lower than the first management temperature.

Evidently, by implementing the apparatus of intelligent water shortage detection and management for a cooking appliance described in FIG. 4, for the temporary regulation command triggered by the user when the steam generator is in the water shortage mandatory management state, the corresponding temperature detection program is set up, which is able to detect the target temperature of the steam generator in real time based on the temporary regulation command, and the steam generator as well as the heating components may restart after it is determined that the target temperature is adjusted to the first management temperature, reducing the occurrence of failing to respond to the temporary regulation command of the user due to not timely updating of the value corresponding to the target temperature.

In an optional implementation, the generating module 305 is also used for, when it is determined that the target temperature is not adjusted to be lower than the first management temperature, generating cooling management information with respect to the steam generator and the heating component in accordance with the target temperature, the first management temperature and the cooling management program;

As shown in FIG. 4, the apparatus also includes a feedback module 310.

The feedback module 310 is used for feeding the cooling management information and the water shortage regulatory information back to the user to advise the user that the target temperature is higher or equal to the first management temperature and the cooling process is required to be performed.

The detecting module 308 is also used for detecting whether a feedback command of the user with respect to the cooling management information is received.

The cooling management module 306 is also used for performing the cooling process for the steam generator to adjust the target temperature to be lower than the first management temperature in accordance with the feedback command and the cooling management information when it is detected that the feedback command of the user with respect to the cooling management information is received.

Evidently, by implementing the apparatus of intelligent water shortage detection and management for a cooking appliance described in FIG. 4, in the case of detecting the temporary regulation command triggered by the user and aiming to adjust the target temperature to the first management temperature, the corresponding cooling management information is generated by integrating a number of parameters based on the target temperature, the first management temperature, and the cooling management program, and then the cooling management information as well as the water shortage regulatory information is fed back to the user in order to secondly prompt the user that the steam generator/cooking appliance is in the water shortage mandatory management state, which simultaneously facilitates the user to accurately and quickly deal with the current water shortage mandatory management state of the steam generator/cooking appliance (timely pumping/steam generator cooling) in accordance with the cooling management information, while improving the user experience, improving the service life of the entire cooking appliance, reducing the probability of malfunctioning of the entire cooking appliance.

Embodiment 4

Figure 5:
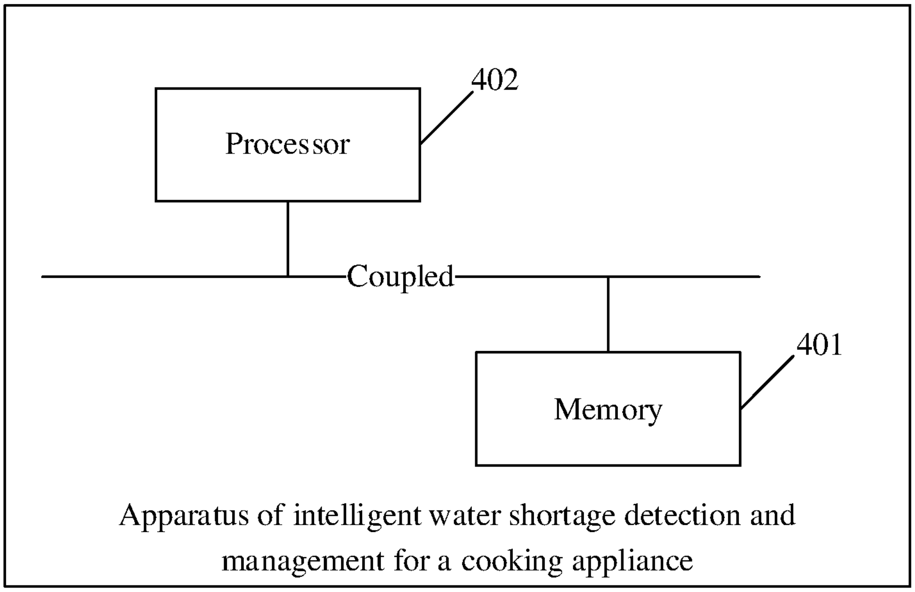
FIG. 5 is a structural diagram of a further apparatus of intelligent water shortage detection and management for a cooking appliance disclosed in an embodiment of the present disclosure.

Referring to FIG. 5, FIG. 5 is a structural diagram of another apparatus of intelligent water shortage detection and management for a cooking appliance disclosed in an embodiment of the present disclosure. As shown in FIG. 5, the apparatus of intelligent water shortage detection and management for a cooking appliance may include:

a memory 401, memorized with an executable code; and a processor 402, coupled with the memory 401, in which the processor 402 invokes the executable code memorized in the memory 401 to perform steps of the method of intelligent water shortage detection and management for a cooking appliance described in the embodiment 1 or embodiment 2 of the present disclosure.

Embodiment 5

Disclosed in the present embodiment of the disclosure is a non-transitory computer memory medium, the non-transitory computer memory medium memorizes computer instructions; when the computer instructions are invoked, steps of the method of intelligent water shortage detection and management for a cooking appliance described in the embodiment 1 and embodiment 2 of the present disclosure are performed.

Embodiment 6

Disclosed in the present embodiment of the disclosure is a computer program product, the computer program product including a non-instantaneous computer readable memory medium memorized with a computer program. The computer program may be operated to enable the computer to perform steps in the method of intelligent water shortage detection and management for a cooking appliance described in the embodiment 1 or embodiment 2.

The aforementioned described embodiment of the apparatus is only illustrative. The modules described as separate components may or may not be physically separated, and the modules used as components for display may or may not be physical modules, that is, they may be located in the same place or may be distributed to a plurality of network modules. Some or all these modules may be selected according to practical demands to achieve the purpose of the solution of the present embodiment. It may be understood and performed by a person of ordinary skill in the art without inventive effort.

With the specific description of the above embodiments, it is clear to those skilled in the art that the various implementations may be implemented with the aid of software plus the necessary common hardware platform, and admittedly, with the aid of hardware. Based on such an understanding, the above technical solutions that essentially or contribute to the prior art may be embodied in the form of a software product which may be memorized in a non-transitory computer-readable memory medium, the non-transitory memory medium including Read-Only Memory, Random Access Memory, Programmable Read-only Memory, Erasable Programmable Read Only Memory, One-time Programmable Read-Only Memory, Electrically-Erasable Programmable Read-Only Memory, Compact Disc Read-Only Memory, other Compact Disc Memory, Disk Memory, Tape Memory or any other non-transitory computer-readable medium that may be used to carry or memorize data.

Finally, it should be noted that the method and the apparatus of intelligent water shortage detection and management for a cooking appliance disclosed in the embodiments of the present disclosure are only preferred embodiments of the present disclosure, and are only used to illustrate the technical solutions of the present disclosure, but not to limit them. Despite the detailed description of the disclosure with reference to the aforementioned embodiments, it should be understood, by those skilled in the art, that the technical solutions recorded in the aforementioned embodiments may still be modified, or equivalent substitutions for some of the technical features thereof may be made; which the essence of the corresponding technical solutions of these modifications or substitutions is without departing from the spirit and scope of the technical solutions of the various embodiments of the disclosure.

The invention claimed is:

1. A method of intelligent water shortage detection and management for a cooking appliance, wherein, the cooking appliance being configured with a steam generator, the cooking appliance comprising an air fryer, a steam oven or a steam fryer, the method comprises:

outputting a water shortage prompt by controlling an alarm beeping device in accordance with a preset warning program when it is detected that the steam generator satisfies a preset water shortage control condition, performing a preset water shortage management program, and detecting and obtaining a target temperature corresponding to the steam generator after performing the water shortage management program;

determining whether the target temperature is lower than a preset first management temperature, and confirming that a water shortage management is completed with respect to the steam generator when it is determined that the target temperature is lower than the first management temperature; and performing a preset standby control program to control a corresponding heating component of the steam generator to stop heating when it is determined that the target temperature is higher than or equal to the first management temperature, and generating water shortage regulatory information with respect to the steam generator to advise the user that the steam generator is currently in a water shortage state and that a mandatory regulatory program to deal with the water shortage state is initiated;

wherein the steam generator satisfying the preset water shortage control condition comprises:

identifying that the steam generator satisfies the preset water shortage control condition when a detected temperature corresponding to the steam generator reaches a preset temperature threshold and/or when a steam content in a steam space corresponding to the cooking appliance is lower than a preset steam threshold, wherein a water tank in the cooking appliance is used to provide water storage for the steam generator; and the steam content in the steam space is data obtained by collecting the steam content in the steam space after it is confirmed that a steam function corresponding to the steam generator has been initiated.

2. The method of intelligent water shortage detection and management for a cooking appliance according to claim 1, wherein performing a preset water shortage management program comprises:

generating a water shortage control command with respect to the steam generator, and suspending heating of the steam generator in accordance with the water shortage control command;

controlling a timer to time in accordance with a first preset duration, and performing a preset pumping-cooling program after timing is completed; triggering execution of, after it is confirmed that pumping and cooling are completed for the steam generator, detecting and obtaining a target temperature corresponding to the steam generator after performing the water shortage management program, wherein performing a preset pumping-cooling program comprises:

controlling a water pump configured in the cooking appliance to perform a continuous pumping and cooling operation for the steam generator within a second preset duration.

3. The method of intelligent water shortage detection and management for a cooking appliance according to claim 2, wherein, before performing a preset standby control program when it is determined that the target temperature is higher than or equal to the first management temperature, the method also comprises:

determining whether an accumulated duration of the timer reaches a third preset duration, and triggering execution of the preset standby control program when it is determined that the accumulated duration of the timer reaches the third preset duration;

performing a preset cooling management program repeatedly when it is determined that the accumulated duration of the timer does not reach the third preset duration; the cooling management program comprises a timing control program, the pumping-cooling program, and a temperature detection and updating program, wherein terminating the cooling management program and triggering execution of the preset standby control program when the accumulated duration of the timer reaches the third preset duration and the target temperature is higher than a preset second management temperature, the second management temperature being higher than the first management temperature; and terminating the cooling management program and confirming that the water shortage management is completed with respect to the steam generator when the accumulated duration of the timer does not reach the third preset duration and the target temperature is lower than the first management temperature.

4. The method of intelligent water shortage detection and management for a cooking appliance according to claim 3, wherein performing the preset cooling management program comprises:

controlling the timer to time in accordance with a preset cooling management duration; after the timing is completed, controlling the water pump configured in the cooking appliance to pump water in accordance with a preset pumping duration; performing a cooling process for the steam generator;

detecting a present temperature of the steam generator and updating the target temperature in accordance with the present temperature after it is confirmed that the cooling process for the steam generator is performed; and updating a performed count of the cooling management program simultaneously, wherein the cooling management duration is correspondingly decreased by a fourth preset duration for each increase in the performed count of the cooling management program.

5. The method of intelligent water shortage detection and management for a cooking appliance according to claim 3, wherein, after generating the water shortage regulatory information with respect to the steam generator, the method also comprises:

detecting whether a temporary regulation command triggered by a user is received, the temporary regulation command being used to initiate heating of the steam generator;

determining whether the target temperature is adjusted to be lower than the first management temperature when it is detected that the temporary regulation command triggered by the user is received; and controlling the steam generator and the heating component to perform a heating control operation for the steam generator in accordance with the temporary regulation command when it is determined that the target temperature is adjusted to be lower than the first management temperature.

6. The method of intelligent water shortage detection and management for a cooking appliance according to claim 4, wherein, after generating the water shortage regulatory information with respect to the steam generator, the method also comprises:

detecting whether a temporary regulation command triggered by a user is received, the temporary regulation command being used to initiate heating of the steam generator;

determining whether the target temperature is adjusted to be lower than the first management temperature when it is detected that the temporary regulation command triggered by the user is received; and controlling the steam generator and the heating component to perform a heating control operation for the steam generator in accordance with the temporary regulation command when it is determined that the target temperature is adjusted to be lower than the first management temperature.

7. The method of intelligent water shortage detection and management for a cooking appliance according to claim 5, wherein, when it is determined that the target temperature is not adjusted to be lower than the first management temperature, the method also comprises:

generating cooling management information with respect to the steam generator and the heating component in accordance with the target temperature, the first management temperature and the cooling management program; feeding the cooling management information and the water shortage regulatory information back to the user to advise the user that the target temperature is higher or equal to the first management temperature and a cooling process is required to be performed;

detecting whether a feedback command of the user with respect to the cooling management information is received; and performing the cooling process for the steam generator to adjust the target temperature to be lower than the first management temperature in accordance with the feedback command and the cooling management information when it is detected that the feedback command of the user with respect to the cooling management information is received.

8. The method of intelligent water shortage detection and management for a cooking appliance according to claim 6, wherein, when it is determined that the target temperature is not adjusted to be lower than the first management temperature, the method also comprises:

generating cooling management information with respect to the steam generator and the heating component in accordance with the target temperature, the first management temperature and the cooling management program; feeding the cooling management information and the water shortage regulatory information back to the user to advise the user that the target temperature is higher or equal to the first management temperature and the cooling process is required to be performed;

detecting whether a feedback command of the user with respect to the cooling management information is received; and performing the cooling process for the steam generator to adjust the target temperature to be lower than the first management temperature in accordance with the feedback command and the cooling management information when it is detected that the feedback command of the user with respect to the cooling management information is received.

9. An apparatus of intelligent water shortage detection and management for a cooking appliance, wherein, the cooking appliance being configured with a steam generator, the cooking appliance comprising an air fryer, a steam oven or a steam fryer, the apparatus comprises:

a water shortage management module, used for outputting a water shortage prompt by controlling an alarm beeping device in accordance with a preset warning program when it is detected that the steam generator satisfies a preset water shortage control condition, performing a preset water shortage management program, and detecting and obtaining a target temperature corresponding to the steam generator after performing the water shortage management program;

a determining module, used for determining whether the target temperature is lower than a preset first management temperature;

a confirming module, used for confirming that a water shortage management is completed with respect to the steam generator when it is determined that the target temperature is lower than the first management temperature;

a standby control module, used for performing a preset standby control program to control a corresponding heating component of the steam generator to stop heating when it is determined that the target temperature is higher than or equal to the first management temperature; and a generating module, used for generating water shortage regulatory information with respect to the steam generator to advise a user that the steam generator is currently in a water shortage state and that a mandatory regulatory program to deal with the water shortage state is initiated.

10. An apparatus of intelligent water shortage detection and management for a cooking appliance, wherein the apparatus comprises:

a memory, memorized with an executable code; and a processor, coupled with the memory, wherein the processor invokes the executable code memorized in the memory to perform a method of intelligent water shortage detection and management for a cooking appliance, wherein, the cooking appliance being configured with a steam generator, the cooking appliance comprising an air fryer, a steam oven or a steam fryer, the method comprises:

outputting a water shortage prompt by controlling an alarm beeping device in accordance with a preset warning program when it is detected that the steam generator satisfies a preset water shortage control condition, performing a preset water shortage management program, and detecting and obtaining a target temperature corresponding to the steam generator after performing the water shortage management program;

determining whether the target temperature is lower than a preset first management temperature, and confirming that a water shortage management is completed with respect to the steam generator when it is determined that the target temperature is lower than the first management temperature; and performing a preset standby control program to control a corresponding heating component of the steam generator to stop heating when it is determined that the target temperature is higher than or equal to the first management temperature, and generating water shortage regulatory information with respect to the steam generator to advise a user that the steam generator is currently in a water shortage state and that a mandatory regulatory program to deal with the water shortage state is initiated;

wherein the steam generator satisfying the preset water shortage control condition comprises:

identifying that the steam generator satisfies the preset water shortage control condition when a detected temperature corresponding to the steam generator reaches a preset temperature threshold and/or when a steam content in a steam space corresponding to the cooking appliance is lower than a preset steam threshold, wherein a water tank in the cooking appliance is used to provide water storage for the steam generator; and the steam content in the steam space is data obtained by collecting the steam content in the steam space after it is confirmed that a steam function corresponding to the steam generator has been initiated.

11. The apparatus of intelligent water shortage detection and management for a cooking appliance according to claim 9, wherein the steam generator satisfying the preset water shortage control condition comprises:

identifying that the steam generator satisfies the preset water shortage control condition when a detected temperature corresponding to the steam generator reaches a preset temperature threshold and/or when a steam content in a steam space corresponding to the cooking appliance is lower than a preset steam threshold, wherein a water tank in the cooking appliance is used to provide water storage for the steam generator; and the steam content in the steam space is data obtained by collecting the steam content in the steam space after it is confirmed that a steam function corresponding to the steam generator has been initiated.

12. The apparatus of intelligent water shortage detection and management for a cooking appliance according to claim 9, wherein the water shortage management module performing a preset water shortage management program comprises:

generating a water shortage control command with respect to the steam generator, and suspending heating of the steam generator in accordance with the water shortage control command;

controlling a timer to time in accordance with a first preset duration, and performing a preset pumping-cooling program after timing is completed; triggering execution of, after it is confirmed that pumping and cooling are completed for the steam generator, detecting and obtaining a target temperature corresponding to the steam generator after performing the water shortage management program, wherein performing a preset pumping-cooling program comprises:

controlling a water pump configured in the cooking appliance to perform a continuous pumping and cooling operation for the steam generator within a second preset duration.

13. The apparatus of intelligent water shortage detection and management for a cooking appliance according to claim 12, wherein the determining module, before performing a preset standby control program when it is determined that the target temperature is higher than or equal to the first management temperature, is further configured for:

determining whether an accumulated duration of the timer reaches a third preset duration, and triggering execution of the preset standby control program when it is determined that the accumulated duration of the timer reaches the third preset duration;

the apparatus further comprises:

a cooling management module, used for performing a preset cooling management program repeatedly when it is determined that the accumulated duration of the timer does not reach the third preset duration, the cooling management program including a timing control program, the pumping-cooling program, and a temperature detection and updating program;

an interrupt control module, used for terminating the cooling management program and triggering the standby control module to execute the preset standby control program when the accumulated duration of the timer reaches the third preset duration and the target temperature is higher than a preset second management temperature, the second management temperature being higher than the first management temperature; and the interrupt control module is also used for terminating the cooling management program and confirming that the water shortage management is completed with respect to the steam generator when the accumulated duration of the timer does not reach the third preset duration and the target temperature is lower than the first management temperature.

14. The apparatus of intelligent water shortage detection and management for a cooking appliance according to claim 13, wherein the cooling management module performing the preset cooling management program comprises:

controlling the timer to time in accordance with a preset cooling management duration; after the timing is completed, controlling the water pump configured in the cooking appliance to pump water in accordance with a preset pumping duration; performing a cooling process for the steam generator;

detecting a present temperature of the steam generator and updating the target temperature in accordance with the present temperature after it is confirmed that the cooling process for the steam generator is performed; and updating a performed count of the cooling management program simultaneously, wherein the cooling management duration is correspondingly decreased by a fourth preset duration for each increase in the performed count of the cooling management program.

15. The apparatus of intelligent water shortage detection and management for a cooking appliance according to claim 13, further comprising:

a detecting module, used for, after generating the water shortage regulatory information with respect to the steam generator, detecting whether a temporary regulation command triggered by a user is received, the temporary regulation command being used to initiate heating of the steam generator;

the determining module is also used for determining whether the target temperature is adjusted to be lower than the first management temperature when it is detected that the temporary regulation command triggered by the user is received; and a heating control module, used for controlling the steam generator and the heating component to perform a heating control operation for the steam generator in accordance with the temporary regulation command when it is determined that the target temperature is adjusted to be lower than the first management temperature.

16. The apparatus of intelligent water shortage detection and management for a cooking appliance according to claim 10, wherein performing a preset water shortage management program comprises:

generating a water shortage control command with respect to the steam generator, and suspending heating of the steam generator in accordance with the water shortage control command;

controlling a timer to time in accordance with a first preset duration, and performing a preset pumping-cooling program after timing is completed; triggering execution of, after it is confirmed that pumping and cooling are completed for the steam generator, detecting and obtaining a target temperature corresponding to the steam generator after performing the water shortage management program, wherein performing a preset pumping-cooling program comprises:

controlling a water pump configured in the cooking appliance to perform a continuous pumping and cooling operation for the steam generator within a second preset duration.

17. The apparatus of intelligent water shortage detection and management for a cooking appliance according to claim 16, wherein, before performing a preset standby control program when it is determined that the target temperature is higher than or equal to the first management temperature, the method also comprises:

determining whether an accumulated duration of the timer reaches a third preset duration, and triggering execution of the preset standby control program when it is determined that the accumulated duration of the timer reaches the third preset duration;

performing a preset cooling management program repeatedly when it is determined that the accumulated duration of the timer does not reach the third preset duration; the cooling management program comprises a timing control program, the pumping-cooling program, and a temperature detection and updating program, wherein terminating the cooling management program and triggering execution of the preset standby control program when the accumulated duration of the timer reaches the third preset duration and the target temperature is higher than a preset second management temperature, the second management temperature being higher than the first management temperature; and terminating the cooling management program and confirming that the water shortage management is completed with respect to the steam generator when the accumulated duration of the timer does not reach the third preset duration and the target temperature is lower than the first management temperature.

18. The apparatus of intelligent water shortage detection and management for a cooking appliance according to claim 17, wherein performing the preset cooling management program comprises:

controlling the timer to time in accordance with a preset cooling management duration; after the timing is completed, controlling the water pump configured in the cooking appliance to pump water in accordance with a preset pumping duration; performing a cooling process for the steam generator;

detecting a present temperature of the steam generator and updating the target temperature in accordance with the present temperature after it is confirmed that the cooling process for the steam generator is performed; and updating a performed count of the cooling management program simultaneously, wherein the cooling management duration is correspondingly decreased by a fourth preset duration for each increase in the performed count of the cooling management program.

19. The apparatus of intelligent water shortage detection and management for a cooking appliance according to claim 17, wherein, after generating the water shortage regulatory information with respect to the steam generator, the method also comprises:

detecting whether a temporary regulation command triggered by a user is received, the temporary regulation command being used to initiate heating of the steam generator;

determining whether the target temperature is adjusted to be lower than the first management temperature when it is detected that the temporary regulation command triggered by the user is received; and controlling the steam generator and the heating component to perform a heating control operation for the steam generator in accordance with the temporary regulation command when it is determined that the target temperature is adjusted to be lower than the first management temperature.

20. The apparatus of intelligent water shortage detection and management for a cooking appliance according to claim 18, wherein, after generating the water shortage regulatory information with respect to the steam generator, the method also comprises:

detecting whether a temporary regulation command triggered by a user is received, the temporary regulation command being used to initiate heating of the steam generator;

determining whether the target temperature is adjusted to be lower than the first management temperature when it is detected that the temporary regulation command triggered by the user is received; and controlling the steam generator and the heating component to perform a heating control operation for the steam generator in accordance with the temporary regulation command when it is determined that the target temperature is adjusted to be lower than the first management temperature.

* * * * *